United States Patent
Abbaspour et al.

(10) Patent No.: US 7,552,412 B2
(45) Date of Patent: Jun. 23, 2009

(54) INTEGRATED CIRCUIT (IC) CHIP DESIGN METHOD, PROGRAM PRODUCT AND SYSTEM

(75) Inventors: Soroush Abbaspour, Fishkill, NY (US); Gary S. Ditlow, Garrison, NY (US); Chandramouli V. Kashyap, Round Rock, TX (US); Ruchir Puri, Bladwin Place, NY (US)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 11/274,556

(22) Filed: Nov. 15, 2005

(65) Prior Publication Data

US 2006/0150133 A1 Jul. 6, 2006

Related U.S. Application Data

(60) Provisional application No. 60/628,849, filed on Nov. 17, 2004.

(51) Int. Cl.
*G06F 17/50* (2006.01)
(52) U.S. Cl. .............................................. 716/6; 716/5
(58) Field of Classification Search .................. 716/4–6
See application file for complete search history.

(56) References Cited

U.S. PATENT DOCUMENTS 6,212,665 B1 * 4/2001 Zarkesh et al. ................. 716/4
6,353,917 B1 * 3/2002 Muddu et al. .................. 716/6
6,629,298 B1 * 9/2003 Camporese et al. ............ 716/6
6,998,306 B2 * 2/2006 Kim et al. .................... 438/238

OTHER PUBLICATIONS

Agarwal et al. "An Effective Capacitive Based Driver Output Model for On-Chip RLC Interconnects," ACM, Jun. 2-6, 2003, pp. 376-381.*
Abbaspour et al., "Calculating the Effective Capacitance for the RC Interconnect in VDSM Technologies," IEEE, Jan. 2003, pp. 43-48.*
Mei et al., "An Accurate Low Iteration Algorithm for Effective Capacitance Computation," ACM, Jul. 2004, pp. 1-6.*
Kahng et al., "Improved Effective Capacitance Computations for Use in Logic and Layout Optimization," IEEE, 1999, pp. 1-5.*

* cited by examiner

*Primary Examiner*—Vuthe Siek
(74) *Attorney, Agent, or Firm*—Law Office of Charles W. Peterson, Jr.; Brian P. Verminski, Esq.

(57) ABSTRACT

A circuit design method, computer program product and chip design system embodying the method. A gate selected for static timing analysis (STA) from a circuit design. Initial performance characteristics (e.g., load and transition slew) are determined for the selected gate. A charge equivalent effective capacitance ($C_{Qeff}$) is determined for the gate from the initial performance characteristics. A gate delay is determined in a single pass for the gate using $C_{Qeff}$ as an effective load for said selected gate. Optionally, if the total gate load capacitance ($C_{tot}$) exceeds $C_{Qeff}$ by less than a minimum, the effective capacitance ($C_{eff}$) is determined and used for determining the gate delay instead.

26 Claims, 4 Drawing Sheets

INTEGRATED CIRCUIT (IC) CHIP DESIGN METHOD, PROGRAM PRODUCT AND SYSTEM

CROSS REFERENCE TO RELATED APPLICATION

The present invention is a continuation of Provisional U.S. Patent Application No. 60/628,849, entitled "Fast Timing Analysis for Gates" to Gary Ditlow et al., filed Nov. 17, 2004 assigned to the assignee of the present invention and is incorporated herein by reference.

BACKGROUND OF THE INVENTION

1. Field of the Invention

The present invention generally relates to physical circuit design and more particularly to reducing design to hardware time for Very Large Scale Integrated (VLSI) circuit designs, especially Very Deep Submicron (VDSM) VLSI.

2. Background Description

State of the art integrated circuit (IC) logic chips have logic that may be interactively placed and wired, principally, based upon logic timing. Generally, for a typical synchronous logic chip, logic paths are bracketed by flip flops or registers that are clocked by on-chip clocks, i.e., a clock sets a flip flop at the beginning of a path and after a given (clock) period, the results are locked in a second flip flop at the other end of the path. So, the time between clock edges determines how much time is available for a signal to propagate along the particular path. Since an initial placement is a coarse placement, it likely to include paths that would fail in hardware.

In what is known as Static Timing Analysis (STA), path delays are calculated for the entire design, block-by-block, gate-by-gate, net wire-by-wire. After STA, the designer can identify any failing paths, i.e., where the path delay is longer than the available time. STA also identifies any extra time between the calculated propagation delay time and the clock period, which is known as slack. Normally by design, there is a required minimum amount of slack specified. Thus, after STA one may determine any path with less than that specified required amount of slack, i.e., what is known as a critical path. Critical paths are most sensitive to process, voltage or temperature variations or anything else that might change path timing, and so, most likely to encounter timing related problems.

Thus, typically, chip design is iterative, with the designer using STA results from one iteration to determine each critical or failing path and its associated nets are, e.g., using what is known as a slack graph for the logic that indicates slack in individual paths. STA performs a gate-by-gate response analysis, iteratively for each gate determining an effective capacitance for the gate and a gate response to that effective capacitance. Typically, in each iteration an effective capacitance is calculated based on an output transition slew from the previous iteration and, a new output transition slew is determined, e.g., retrieved from a look up table. After determining a response for each gate, path delays may be determined as the sum of gate responses for each particular path. Only after determining path delays, may the designer identify design sensitivities or failures for the current chip design pass.

After identifying design sensitivities or failures, the chip designer may adjust the design to eliminate both failing and, where possible, critical paths, e.g., by relocating some logic in the critical paths to non-critical paths. Normally, after identifying critical paths, only those critical path nets are considered for optimization to eliminate criticalities, e.g., re-locating cells, re-powering cells and in severe cases, redesigning logic for the critical path. This is a long arduous task. Further, redesigning one book or net in the critical path is not considered with respect to its affect on other nets in other critical paths that might also include the redesigned critical net. Consequently, redesigning one net in one critical path might help or hinder fixing other critical paths. So, after each re-design iteration the designer must again use STA to locate and eliminate critical paths.

Accordingly, it is becoming increasingly important for design success to improve STA accuracy and efficiency, especially as technology dimensions reach very deep into the sub-micron and nanometer range. These smaller features increase the per unit gate density for logic chips, even as chip size is increasing. Thus, chip density is increasing geometrically. Consequently, even if the time to calculate each individual gate response is reduced, STA time is increasing dramatically.

Thus, there is a need for an reducing chip design time and more particularly, for reducing the design time required for Static Timing Analysis (STA).

SUMMARY OF THE INVENTION

It is therefore a purpose of the invention to reduce overall static timing analysis (STA) time in required for Integrated Circuit (IC) chip design;

It is another purpose of this invention to optimize reduce the STA time required for each gate;

It is yet another purpose of the invention to reduce the time in STA required for determining an effective capacitance for each gate of a chip design;

It is yet another purpose of the invention to reduce the time in STA for Very Large Scale Integrated (VLSI), Very Deep Submicron (VDSM) VLSI chip designs by reducing the time required for determining an effective capacitance for each gate of a chip design, thereby reducing gate delay calculation time.

The present invention is related to a circuit design method, computer program product and chip design system embodying the method. A gate selected for static timing analysis (STA) from a circuit design. Initial performance characteristics (e.g., load and transition slew) are determined for the selected gate. A charge equivalent effective capacitance ($C_{Qeff}$) is determined for the gate from the initial performance characteristics. A gate delay is determined in a single pass for the gate using $C_{Qeff}$ as an effective load for said selected gate. Optionally, if the total gate load capacitance ($C_{tot}$) exceeds $C_{Qeff}$ by less than a minimum, the effective capacitance ($C_{eff}$) is determined and used for determining the gate delay instead.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
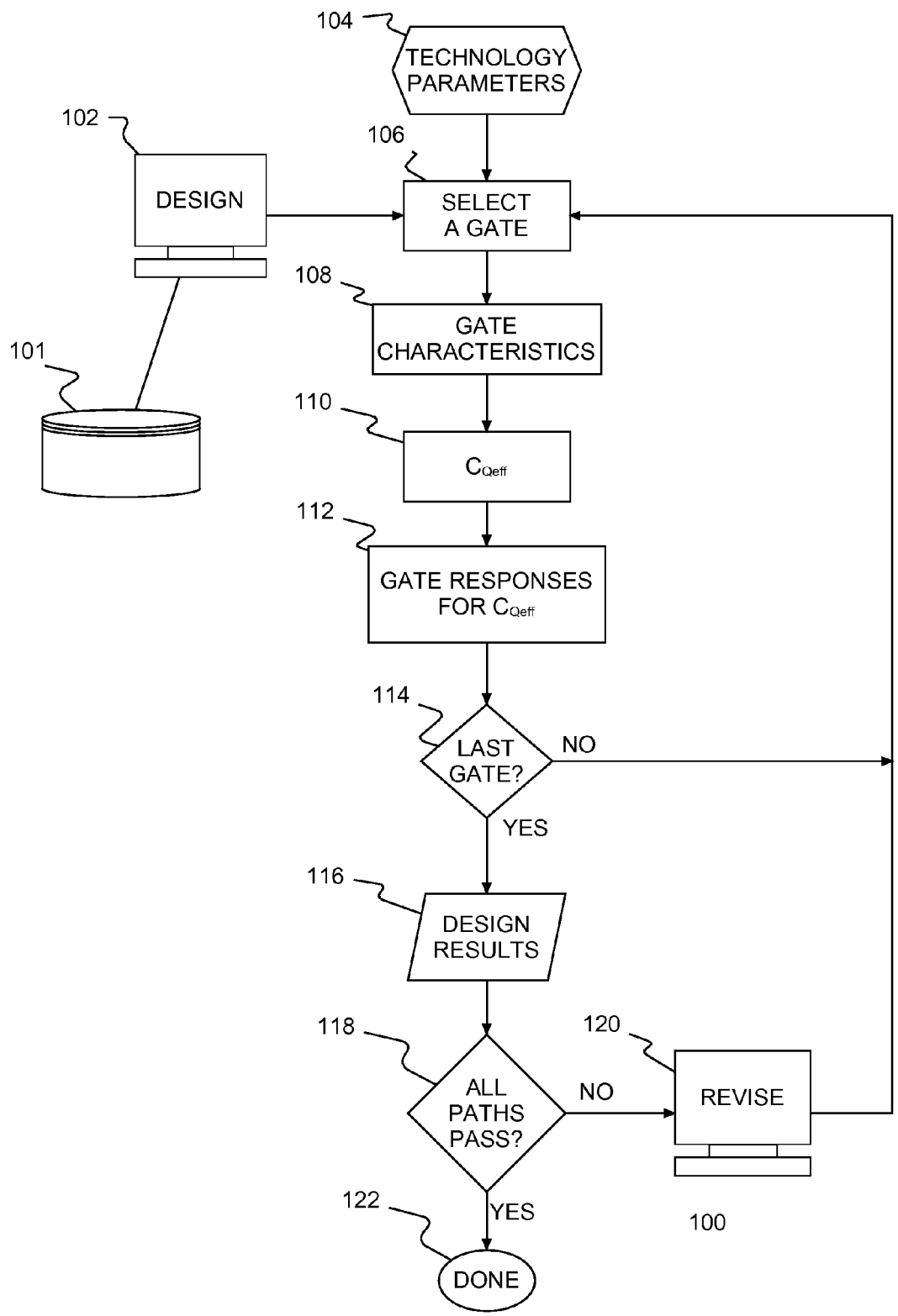
FIG. 1 shows a flow diagram example of application of preferred embodiment Static Timing Analysis (STA) according to the present invention.

Turning now to the drawings, and more particularly, FIG. 1 shows a flow diagram example 100 of application of preferred embodiment Static Timing Analysis (STA) according to the present invention. The preferred STA method may include a computer program product that may be stored in any computer readable storage 101 (e.g., magnetic storage media such as magnetic tape, magnetic disk, optical storage such as compact disk (CD) or digital versatile disk (DVD), or any suitable equivalent non-volatile or volatile storage media) for use in any suitable general purpose computer 102. STA time is dramatically reduced by reducing gate delay calculation time for each gate by providing a close approximation to effective load capacitance in a single pass with a single table look up instead multiple such look ups required by prior art approaches to finding effective load capacitance. Optionally, when the approximated effective load capacitance total is too close to gate load capacitance, the effective capacitance may be determined, selectively, and used for determining the gate delay instead.

So, beginning in step 102 a circuit design is provided for STA, e.g., after place and wire, and in step 104 technology parameters are defined for the design, e.g., lookup tables for logic gates, and geometric characteristics for physical shapes. Then, beginning in step 106, a gate is selected from the design. Then, in step 108 parameters are collected for the selected gate. Such parameters may include, for example, the slew for signals driving the gate, $\pi$ resistance ($R_\pi$) and $\pi$ capacitors with the $\pi$ capacitors being differentiated as near the gate ($C_n$) and at the far end of the wire ($C_f$) and both separated from each other by $R_\pi$. In step 110, a charge equivalent effective load capacitance ($C_{Qeff}$) is determined, i.e., from the well-known fundamental relationship charge equals capacitance times voltage (Q=CV). Thus, $C_{Qeff}$ is a pure capacitance that can replace the RC-$\pi$ load during the gate delay calculation, such that both the RC-$\pi$ load and $C_{Qeff}$ store the same charge (Q) to a selected gate output voltage transition point (V), e.g., the 50% point of the output transition. In step 112, the gate delay and output transition times are determined in a single pass from $C_{Qeff}$ for the selected gate. In step 114, the design is checked to determine if delays have been determined for all gates; and if not, returning to step 106 another gate is selected. Once delays have been determined for the last gate in step 114, the design results 116 are checked in step 118 to determine if path delays are acceptable for all paths. If not, then in step 120, the design is revised, e.g., re-locating cells, re-powering cells and in severe cases, redesigning logic for the failing/critical path(s). Then, the revised design is passed back to gate selection step 106. However, if all path delays are acceptable in step 118, STA is complete in step 122 and the finished design may be forwarded, e.g., for mask making and hardware fabrication.

Figure 2A:
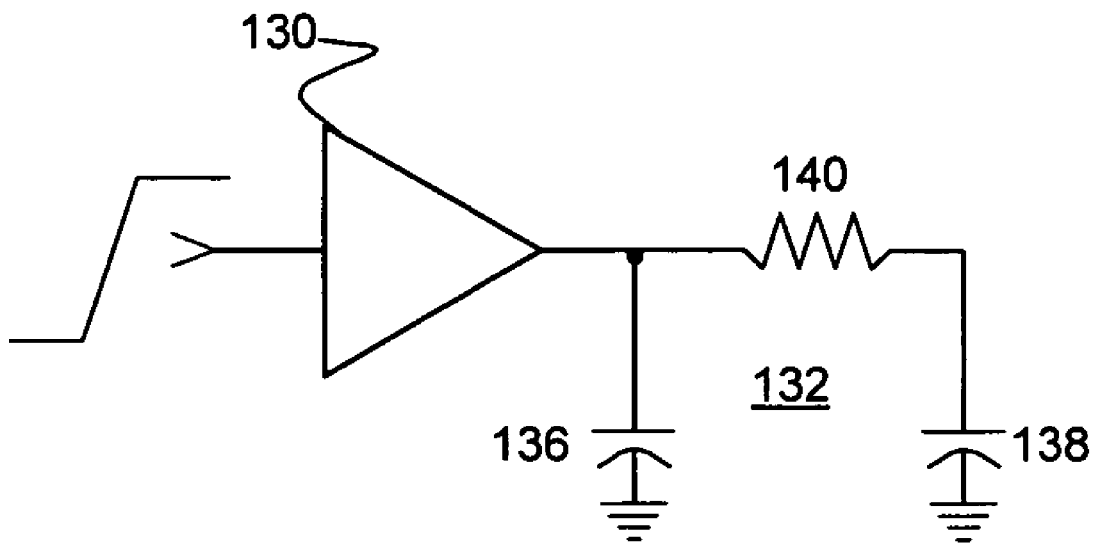
FIGS. 2A-B show an example of a gate driving a RC-π load and its charge equivalent for STA.
Figure 2B:
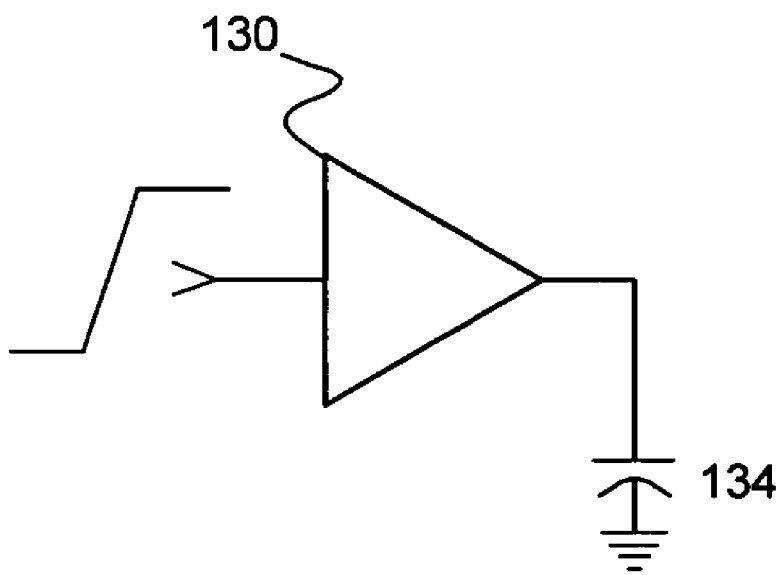

FIGS. 2A-B show an example of a gate 130 driving a single RC-$\pi$ load 132, in this example, e.g., determined in step 106 of FIG. 1; and its charge equivalent 134 for STA, determined according to a preferred embodiment of the present invention. Although this simple example shows a single RC-$\pi$ load 132, this is for example only. It is understood that a more complex, ladder type network of multiple series connected such RC-$\pi$ structures may be required for a large net such as a global clock line spanning a chip with multiple branches connected to inputs to multiple local clock driver circuits. The gate 130 drives RC-$\pi$ load 132, which includes $C_n$ 136 and $C_f$ 138 at opposite ends of $R_\pi$ 140. Thus, in FIG. 2B, the gate 130 drives charge equivalent capacitor $C_{Qeff}$ 134 determined in step 110 from the RC-$\pi$ load 132 for determining gate delay and output transition times in step 112.

So, for a particular gate the total capacitance ($C_{tot}$) for the RC-$\pi$ load 132 is ($C_{tot}=C_n+C_f$). Thus, for example, the slew of typical output transition exhibits dominant characteristics at different points of the transition. For example, the transition is predominantly linear (ramps up or down) for the period of some $\delta$ prior to reaching the final steady state transition level (i.e., above ground for a high to low transition and below $V_{dd}$ for a low to high transition) and predominantly exponential portion for that $\delta$. A specific pure capacitance ($C_{ramp}$ or $C_{exp}$) may be determined for each segment, i.e., prior to and after reaching that $\delta$ at some percentage ($\theta$) of the delay. Thus, $C_{ramp}$ and $C_{exp}$ may be determined by: $C_{ramp}=C_n+k_{ramp}(\theta)*C_f$ and $C_{exp}=C_n+k_{exp}(\theta)*C_f$. So first, an initial slew may be determined based on $C_{tot}$, and using the initial slew each pure capacitance $C_{ramp}$, $C_{Qexp}$ 134 may be determined, each some value between $C_n$ 136 and $C_{tot}$. Further, an overall $C_{Qeff}$ 134 may be determined from $C_{ramp}$ and $C_{exp}$. After $C_{Qeff}$ 134 is determined in step 110, then in step 112 gate, slew and gate delays are determined from $C_{Qeff}$ 134 for the selected gate 130 in a single pass, e.g., retrieving corresponding values for each from a look up table. Of course, once the gate response has been determined, that response may be used, e.g., with the RC-$\pi$ load 132 to determine wire delays for the net.

Optionally, a determination that $C_{Qeff}$ 134 is sufficiently different from $C_{tot}$, such that the ratio of $C_{Qeff}$ 134 to $C_{tot}$ falls below some threshold value ($\eta$), may trigger a more rigorous, traditional determination of effective capacitance ($C_{eff}$). Thus, if this optional step is included gate 130 response is determined from $C_{Qeff}$, unless $\eta>C_{Qeff}/C_{tot}$. So, whenever the ratio fails to exceed $\eta$, $C_{eff}$ is determined and used for determining gate delays and transition slew, in multiple passes (e.g., 4 passes), iteratively retrieving slew and delays, recalculating $C_{eff}$ from the newly retrieved values and returning for another iteration until the recalculated value is substantially the same as the previous iteration.

Figure 3A:
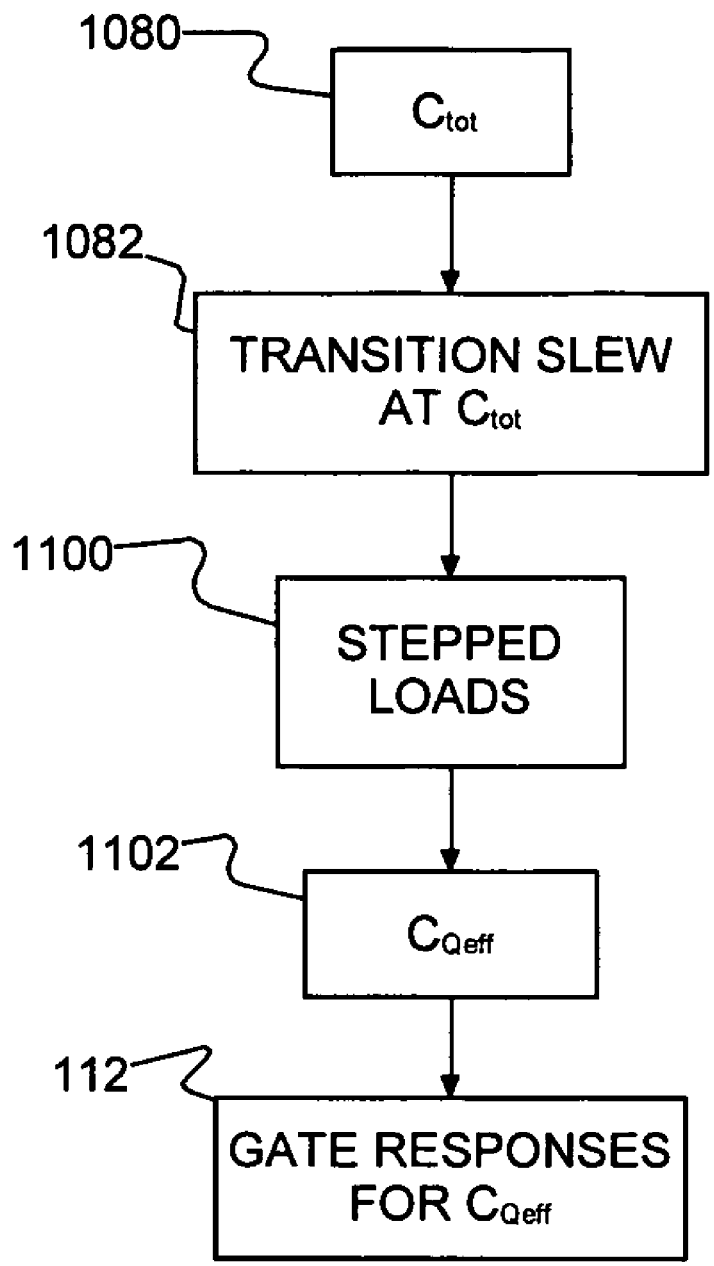
FIGS. 3A-B show examples in more detail of the steps of calculating specific gate responses with and without optional filtering.
Figure 3B:
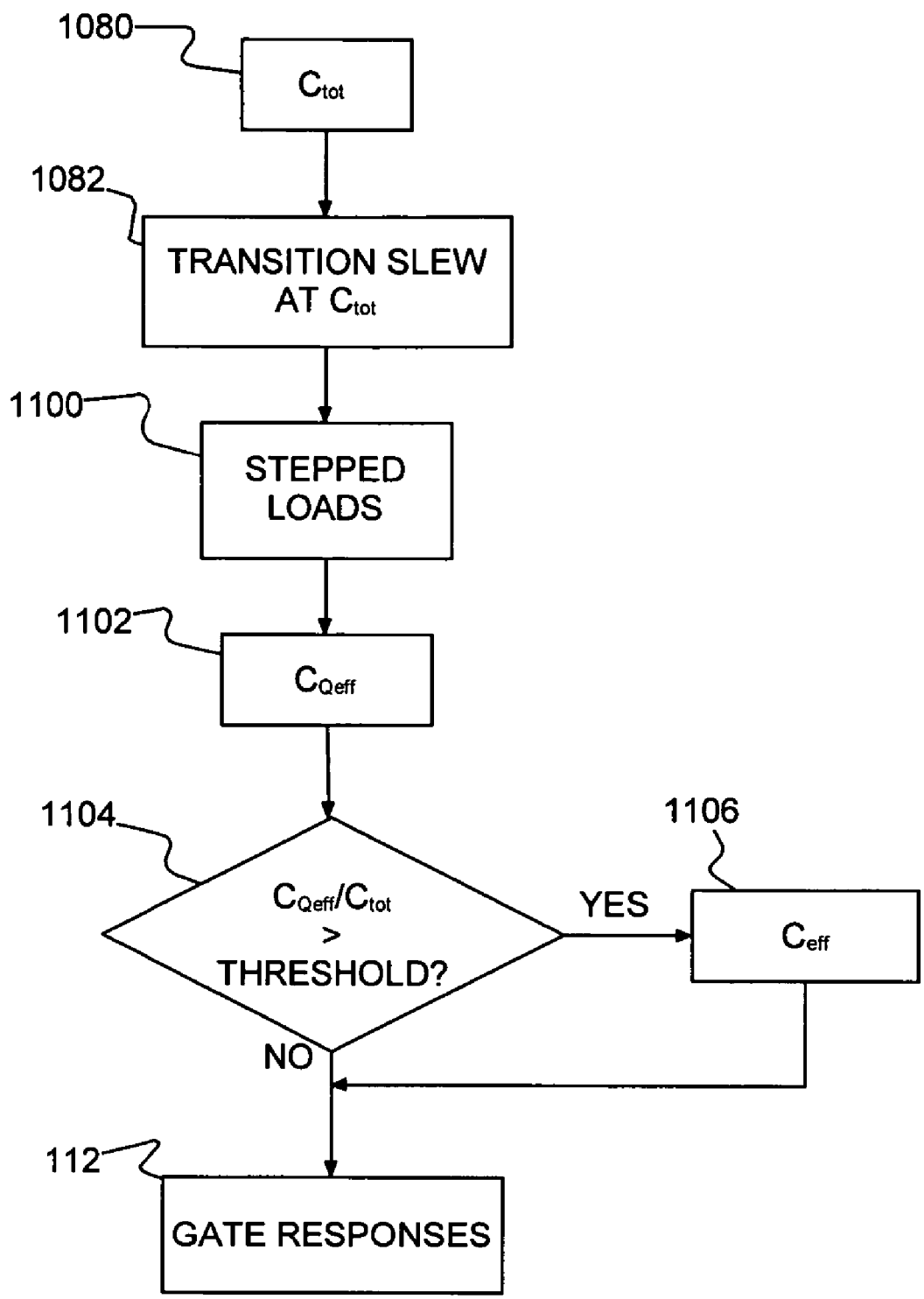

FIGS. 3A-B show examples in more detail of the steps 110-112 of calculating specific gate responses with and without optional filtering according to a preferred embodiment of the present invention. For this example only, the output transition is treated as segmented with a ramp-equivalent portion prior to $\delta$ for a given transition voltage threshold or transition portion (i.e., $\theta$ is 50%) with a specific $C_{ramp}$ effective capacitance; and, an exponential equivalent portion after that $\delta$ threshold with a specific $C_{exp}$ for effective capacitance. So, in step 1080, $C_{tot}$ is determined from $C_n$ and $C_f$ for the output of the gate selected in step 106 of FIG. 1. Next, in step 1082 the transition slew is determined for the gate, based on $C_{tot}$. The threshold point $\delta$ or $\theta$ may be determined from the initial slew, e.g., retrieved with gate characteristics. Alternately, a general global $\delta$ point may be provided with technology parameters (in step 104) or included in the design (in step 102). Then in step 1100, the stepped loads, $C_{ramp}$ and $C_{exp}$, are determined for the selected gate. In step 1102 $C_{Qeff}$ is determined from the stepped loads $C_{ramp}$ and $C_{exp}$. So for this example, in a single look up in step 112 slew and delays are determined from $C_{Qeff}$ for the selected gate. As a result of reducing the number of table lookups, STA gate timing analysis is reduced to a little as one quarter of that required for prior art methods. Since on the average, about 60 percent of the CPU time during STA is devoted to gate timing analysis, reducing CPU time for gate timing analysis may reduce overall STA CPU time by almost 50%.

In the optional example of FIG. 3B, after determining $C_{Qeff}$ in step 1102, the ratio $C_{Qeff}/C_{tot}$ is checked in step 1104 to determine if it is above the minimum threshold, $\eta$, and if not, in step 1106, $C_{eff}$ is determined, typically, in several passes. Then, continuing to step 112, slew and delays are determined from $C_{eff}$ for the selected gate. Otherwise, if $C_{Qeff}/C_{tot}>\eta$, $C_{Qeff}$ is used in 112. Further, actual STA could be a combination of both FIGS. 3A and 3B, e.g., using the unfiltered $C_{Qeff}$ estimate in step 110 of FIG. 1 for one or more design iterations 100, followed by the more rigorous and more precise optional variation of FIG. 3B for step 110 as the design converges on a final design.

Advantageously, preferred embodiment STA dramatically reduces the gate delay and slew calculation, e.g., for Very Deep Submicron (VDSM) technology designs. In a single iteration only cut, charge equivalent effective capacitance, $C_{Qeff}$, can be used instead of $C_{tot}$, or, for more accurate gate timing analysis with a dramatic (experimentally, as high as 87%) reduction in STA gate delay calculation time and, correspondingly, dramatic (experimentally, as high as 51%) reduction in overall STA calculation time. Filtering may be applied to $C_{Qeff}$, using unless it is significantly smaller than $C_{tot}$, i.e., $C_{Qeff}/C_{tot} > \eta$. Furthermore, the occasional instance where $C_{eff}$ is required rather than $C_{Qeff}$ is so infrequent that those instances do not add any significant time to the reduced (as a result of application of the present invention) STA time. Further, experimental results on two large industrial designs have also shown that $C_{Qeff}$, both filtered and unfiltered, provides much higher gate delay accuracy as compared to $C_{tot}$, with resulting errors of 1% that of using the longer, more complicated $C_{eff}$ calculations, even while $C_{Qeff}$ is nearly as efficient as just computing as $C_{tot}$.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

We claim:

1. A computer implemented circuit design method comprising:
   a) providing a circuit design for static timing analysis (STA) by a computer;
   b) selecting a gate from said circuit design;
   c) determining initial performance characteristics by the computer for said selected gate;
   d) determining a charge equivalent effective capacitance ($C_{Qeff}$) for said selected gate from determined said initial performance characteristics, wherein determining $C_{Qeff}$ comprises the computer:
      i) determining stepped loads for said selected gate,
      ii) determining a charge on each of said stepped loads at a selected transition point, and the computer
      iii) determining an equivalent capacitance at said selected transition point; and
   e) determining a gate delay for said selected gate using said $C_{Qeff}$ as an effective load for said selected gate.

2. A circuit design method as in claim 1, wherein said stepped loads are for a ramped transition ($C_{ramp}$) at a first portion of an output transition prior to said selected transition point ($\delta$) and an exponential transition ($C_{exp}$) at a second portion of said output transition after $\delta$.

3. The computer implemented circuit design method as in claim 2, wherein the load for said selected gate is a RC-$\pi$ load having the form of a first capacitor ($C_n$) at said selected gate connected by a resistor ($R_\pi$) to a second capacitor ($C_f$), and $C_{ramp}$ and $C_{exp}$ have the form:

$$C_{ramp}=C_n+k_{ramp}(\theta)*C_f \text{ and } C_{exp}=C_n+k_{exp}(\theta)*C_f.$$

4. The computer implemented circuit design method as in claim 3, wherein said selected gate drives a global clock and said RC-$\pi$ load includes multiple $\pi$ segments.

5. The computer implemented circuit design method as in claim 1, wherein the step (c) of determining initial performance characteristics comprises:
   i) determining total output load capacitance ($C_{tot}$) for said selected gate; and
   ii) determining an output transition slew for said selected gate loaded by $C_{tot}$.

6. The computer implemented circuit design method as in claim 1, further comprising:
   f) determining whether delays have been determined for all gates; and
   g) returning to step (b).

7. The computer implemented circuit design method as in claim 6, wherein when delays are determined for all gates in step (f), said method further comprises:
   h) providing STA results for said circuit design; and
   j) determining whether all paths in said circuit design have a minimum slack.

8. The computer implemented circuit design method as in claim 7, wherein whenever any of said paths have less than said minimum slack in step (j), said method further comprises:
   k) revising said circuit design; and
   j) returning to step (b).

9. The computer implemented circuit design method as in claim 1, wherein the step (a) of providing the circuit design further comprises providing technology parameters describing a technology for fabricating said circuit design.

10. A computer implemented circuit design method comprising:
    a) providing a circuit design for static timing analysis (STA) by a processor;
    b) selecting a gate from said circuit design;
    c) determining initial performance characteristics by the processor for said selected gate;
    d) determining a charge equivalent effective capacitance ($C_{Qeff}$) for said selected gate by the processor from determined said initial performance characteristics;
    e) determining whether total output load capacitance ($C_{tot}$) for said selected gate exceeds $C_{Qeff}$ by less than a minimum; and whenever said minimum is exceeded, determining $C_{eff}$ for said gate output net,
    f) determining a gate delay for said selected gate by the processor, wherein $C_{eff}$ being used instead of $C_{Qeff}$ whenever said minimum is exceeded, otherwise said $C_{Qeff}$ is used as an effective load for said selected gate.

11. The computer implemented circuit design method as in claim 10, wherein the step (c) of determining initial performance characteristics comprises:
    i) determining $C_{tot}$ for said selected gate; and
    ii) determining an output transition slew for said selected gate loaded by $C_{tot}$.

12. The computer implemented circuit design method as in claim 10, further comprising:
    g) determining whether delays have been determined for all gates ; and
    h) returning to step (b).

13. The computer implemented circuit design method as in claim 12, wherein when delays are determined for all gates in step (g), said method further comprises:
    j) providing STA results for said circuit design; and
    k) determining whether all paths in said circuit design have a minimum slack.

14. The computer implemented circuit design method as in claim 13, wherein whenever any of said paths have less than said minimum slack in step (k), said method further comprises:
    l) revising said circuit design; and
    m) returning to step (b).

15. The computer implemented circuit design method as in claim 10, wherein the step (a) of providing the circuit design further comprises providing technology parameters describing a technology for fabricating said circuit design.

16. The computer implemented circuit design method as in claim 10, wherein the step (d) of determining $C_{Qeff}$ comprises:
   i) determining a ramp load ($C_{ramp}$) for a ramped transition at a first portion of an output transition prior to said selected transition point ($\delta$);
   ii) determining an exponential load ($C_{exp}$) for an exponential transition at a second portion of said output transition after $\delta$;
   iii) determining the charge change ($Q_{eff}$) charging/discharging $C_{ramp}$ and $C_{exp}$; and
   iv) determining $C_{Qeff}$ from $Q_{eff}$.

17. The computer implemented circuit design method as in claim 16, wherein the load for said selected gate is a RC-$\pi$ load having the form of a first capacitor ($C_n$) at said selected gate connected by a resistor ($R_\pi$) to a second capacitor ($C_f$), and $C_{ramp}$ and $C_{exp}$ have the form:

$$C_{ramp}=C_n+k_{ramp}(\theta)*C_f \text{ and } C_{exp}=C_n+k_{exp}(\theta)*C_f$$

18. The computer implemented circuit design method as in claim 17, wherein said selected gate drives a global clock and said RC-$\pi$ load includes multiple $\pi$ segments.

19. A computer program product for designing very large scale integrated (VLSI) circuits, said computer program product comprising a computer readable storage device having computer readable program code thereon, said computer readable program code comprising:
   computer readable program code means for receiving a circuit design for static timing analysis (STA);
   computer readable program code means for providing technology parameters describing a technology for fabricating said circuit design, wherein the computer readable program code means for providing technology parameters comprises a lookup table for logic gates in said circuit design, and geometric characteristics for physical shapes;
   computer readable program code means for selecting a gate from said circuit design;
   computer readable program code means for determining initial performance characteristics for each said selected gate;
   computer readable program code means for determining a charge equivalent effective capacitance ($C_{Qeff}$) for said selected gate responsive to said initial performance characteristics;
   computer readable program code means for determining a gate delay for said selected gate responsive to a determined said $C_{Qeff}$;
   computer readable program code means for determining whether $C_{tot}$ exceeds $C_{Qeff}$ by less than a minimum; and
   computer readable program code means for determining $C_{eff}$ for said gate output net responsive to said minimum being exceeded, said computer readable program code means for determining a gate delay using $C_{eff}$ whenever $C_{eff}$ is calculated.

20. A computer program product as in claim 19, wherein the computer readable program code means for determining initial performance characteristics comprises:
   computer readable program code means for determining total output load capacitance ($C_{tot}$) for each said selected gate; and
   computer readable program code means for determining an output transition slew for said selected gate loaded by $C_{tot}$.

21. A computer program product as in claim 20, wherein the computer readable program code means for determining $C_{Qeff}$ comprises:
   computer readable program code means for determining stepped loads for said selected gate;
   computer readable program code means for determining a charge on each of said stepped loads at a selected transition point on said output transition slew; and
   computer readable program code means for determining an equivalent capacitance at said selected transition point.

22. A computer program product as in claim 21, wherein said stepped loads are for a ramped transition ($C_{ramp}$) at a first portion of an output transition prior to said selected transition point and for an exponential transition ($C_{exp}$) at a second portion of said output transition after said selected transition point.

23. A computer program product as in claim 22, wherein the load for said selected gate is a RC-$\pi$ load having the form of a first capacitor ($C_n$) at said selected gate connected by a resistor ($R_{90}$) to a second capacitor ($C_f$), and $C_{ramp}$ and $C_{exp}$ have the form:

$$C_{ramp}=C_n+k_{ramp}(\theta)*C_f \text{ and } C_{exp}=C_n+k_{exp}(\theta)*C_f$$

24. A computer program product as in claim 19, wherein the computer readable program code means for determining whether $C_{tot}$ sufficiently exceeds $C_{Qeff}$ determines whether $C_{Qeff}/C_{tot}>\eta$, where $\eta$ is a determined threshold value.

25. A computer program product as in claim 19, further comprising:
   computer readable program code means for determining whether delays have been determined for all gates;
   computer readable program code means for providing STA results for said circuit design; and
   computer readable program code means for determining whether all paths in said circuit design have a minimum slack.

26. A computer program product as in claim 25, further comprising computer readable program code means for receiving revisions to said circuit design.

* * * * *